March 5, 1963 D. K. PORTER 3,080,127
BEAD WINDING APPARATUS
Filed June 30, 1960 2 Sheets-Sheet 1

INVENTOR.
DONALD K. PORTER
BY
W. A. Shira Jr.
ATTY.

March 5, 1963 D. K. PORTER 3,080,127
BEAD WINDING APPARATUS
Filed June 30, 1960 2 Sheets-Sheet 2

INVENTOR.
DONALD K. PORTER
BY
W. A. Shira Jr.
ATTY.

United States Patent Office 3,080,127
Patented Mar. 5, 1963

3,080,127
BEAD WINDING APPARATUS
Donald K. Porter, Cuyahoga Falls, Ohio, assignor to The B. F. Goodrich Company, New York, N.Y., a corporation of New York
Filed June 30, 1960, Ser. No. 39,882
6 Claims. (Cl. 242—7)

This invention relates to an apparatus for winding filamentary reinforcement material into an annular form and, more particularly, to an apparatus for winding a tire bead core, having a predetermined cross-sectional configuration, from a single strand of reinforcement material.

In the fabrication of bead cores for use in vehicle tires, particularly those types produced in large volume for truck and passenger vehicle tires, it has been generally customary in the past to build up the bead core in a square or rectangular cross-sectional configuration. Such a core presents relatively sharp corners about which the tire carcass reinforcement material must be turned in subsequent tire building operations. During the continual flexing to which a tire is subjected in service, the sharp bead corners tend to fret the carcass which is wrapped about them. This problem is accentuated in those tires in which wire fabric is used in place of textile fabric for the carcass reinforcement. The wrapping of the wire fabric about the bead cores creates high stress areas in the individual wires comprising the reinforcement fabric in the area of the wire adjacent the bead core corners due to the sharp bend of the wire about those corners. Such a condition may easily induce notch cracking, brittle cracking, or other metal fatigue phenomena.

It is desirable, therefore, to fabricate a tire bead core in which the corners about which the carcass reinforcement will be wrapped have a cross-sectional angle appreciably greater than 90 degrees. This may be accomplished, for example, by making the bead core with a half octagonal or half round cross-sectional configuration.

Attempts have been made heretofore to produce tire bead cores having such configurations, but the apparatus employed for forming such cores failed to provide uniform and well-balanced beads. This was due chiefly to lack of proper traverse control during the winding operation. As a result of such lack of control, the bead wire frequently crossed over itself within the individual wire layers of the bead core, creating high stress and incipient wire failure points at the cross-overs.

It is an object of this invention, therefore, to provide an apparatus for automatically winding a multiple layer annular coil from a single strand of wire reinforcement material in which the wire traverse is controlled to prevent wire cross-overs in individual layers of the coil.

It is another object of this invention to provide an apparatus for automatically winding a vehicle tire bead core of predetermined cross-sectional configuration from a single strand of wire in which the wire traverse is automatically controlled to prevent cross-overs in individual layers of the bead and the cross-sectional width of each layer in said core is automatically controlled by pre-settable means.

A further object of this invention is to provide an apparatus for automatically winding a vehicle tire bead core from a single strand of wire in which guide means are provided to control the traverse of said wire on a rotatable building form, and reversing means are provided to reverse the action of said guide means responsive to pre-selected amounts of rotation of said building form.

A still further object of this invention is to provide an apparatus as described in the preceding paragraph in which said reversing means are actuated by fluid pressure operated mechanism, and means responsive to the rotation of said building form are provided to control the application of operating fluid pressure to said mechanism.

Further objects and advantages of the invention will be apparent to those skilled in the art to which it pertains from the following description of the presently preferred embodiment illustrated in the accompanying drawings, forming a part of this application, wherein.

Figure 5:
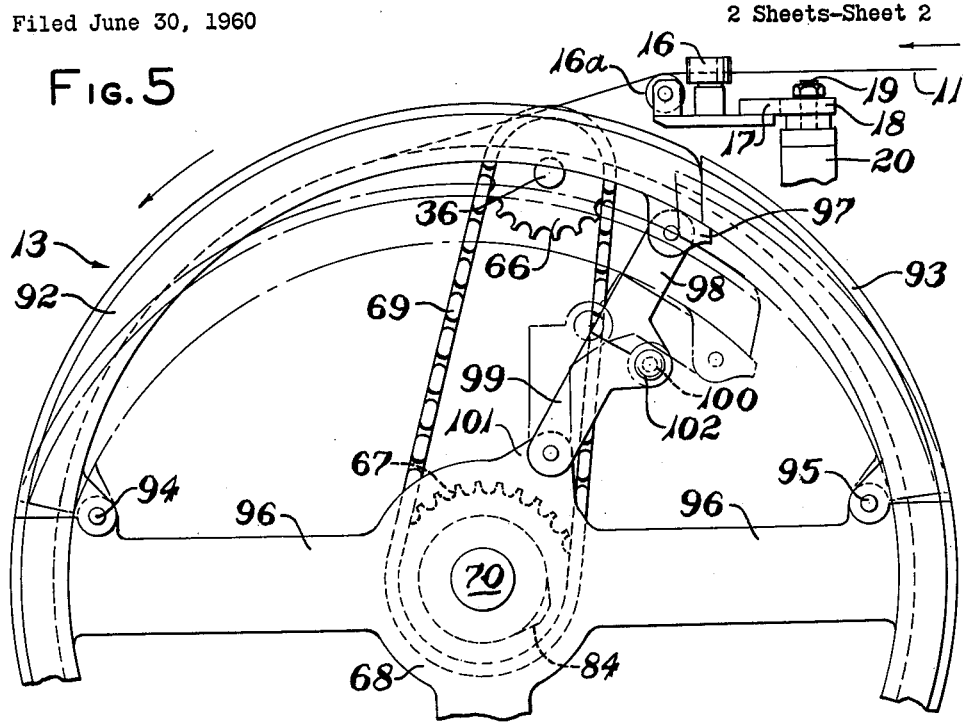
FIG. 5 is a fragmentary side elevational view of the building form showing the relationship thereto of the wire guide rolls.
Figure 4:
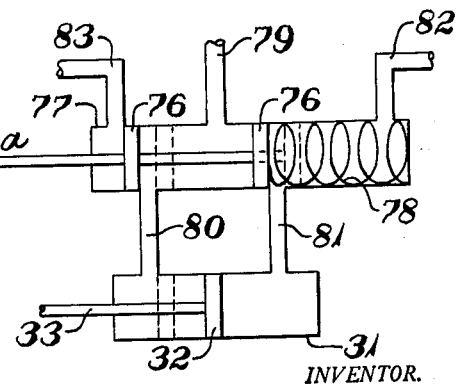
FIG. 4 is an enlarged cross-section through a portion of a completed tire bead core produced by the illustrated apparatus.

The presently preferred form of the apparatus involving this invention is illustrated in the drawings as the machine 10 for winding a single wire strand 11, shown only in FIGS. 4 and 5, into a completed tire bead core 12 having a predetermined cross-sectional configuration such as is shown in FIG. 4. In a machine of this type, the bead core 12 is automatically and continuously built upon a collapsible bead building form, such as 13, from which the completed core may be removed by collapsing the form. The machine is so made that, in its operation, the wire strand 11 is guided onto the building form 13 and traversed thereon in such a manner that crossing of the wire over itself is prevented. For example, the strand 11 is started at one side of the bottom 14 of the form 13 and traversed thereacross as the winding continues. When the strand reaches the other side of the building form 13, its traverse is reversed thus preventing the wire from piling up on itself at the sides. The lower portions of the sides of the building form 13 diverge outwardly and hence form obtuse angles with the bottom 14. Therefore, as wire 11 is wound on the form 13 and traverses the distance between the two sides, the period between traverse reversal becomes progressively longer.

Figure 1:
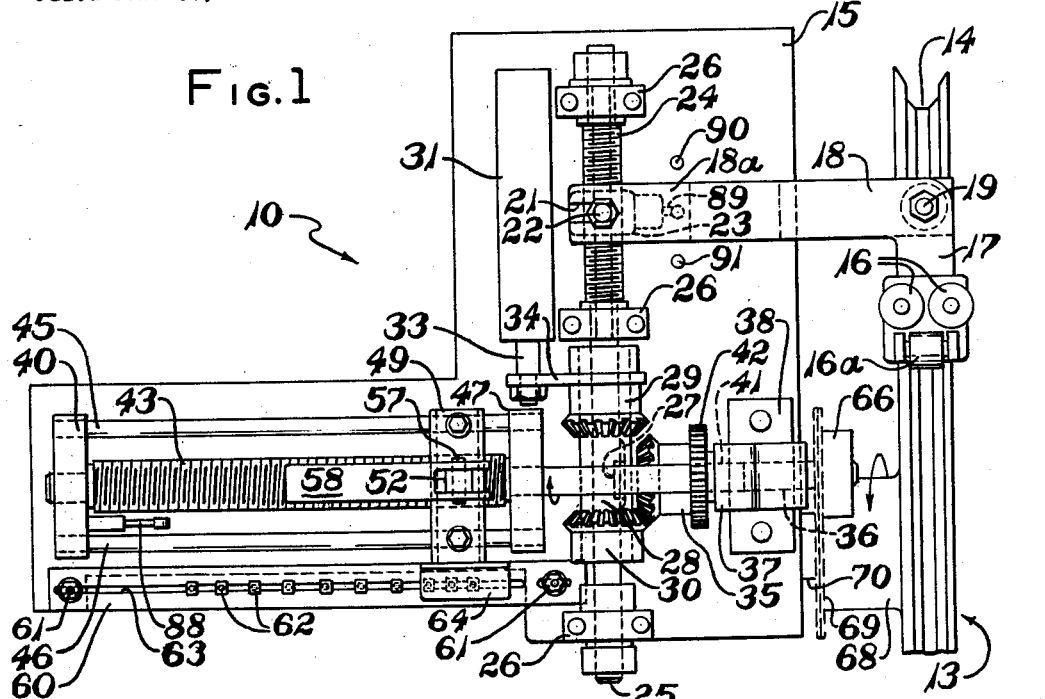
FIG. 1 is a plan view of the apparatus embodying the invention.

Referring now to FIG. 1, it will be seen that the tire bead core building machine 10 includes a suitable frame comprising a base plate 15. Rotatably mounted on the frame, to one side of and below the base plate 15, is the collapsible building form 13 on which the bead core is formed by winding the wire 11 thereon. The wire 11 is guided transversely into place on the form 13 by a pair of axially spaced guide rolls 16 which are rotatably mounted with their axes vertical at one end of a short arm 17 of an L-shaped lever 18. The lever 18 is pivotally mounted by bolt 19 to an "S-shaped" support 20 which is mounted on the base plate 15. At the end of the long arm 18a of the lever arm 18 is a slot 21 in which a bolt 22 is slidably engaged. The bolt 22 is mounted on the top of a reversing screw follower or split nut 23.

The reversing screw follower or split nut 23 is engaged with a reversing screw 24 formed on one end of a shaft 25 which is rotatably mounted horizontally above base plate 15 by means of three bearings 26. A sleeve 28 is slidably mounted on shaft 25 and is connected for rotation therewith by means of a key 27. Coaxially mounted on or integral with sleeve 28 are a pair of spaced miter gears 29 and 30.

The sleeve 28 and the gears 29 and 30 thereon are adapted to be shifted axially by a double-acting fluid pressure mechanism comprising a cylinder 31 containing a piston 32 and a piston rod 33 attached thereto. As shown in FIG. 1, the cylinder 31 is supported parallel to the shaft 25 and a connecting plate 34, mounted on the outer end of piston rod 33, is connected to the sleeve 28 to move the latter, and hence the gears 29 and 30, axially in response to movements of piston 32. A third miter gear 35 is coaxially mounted on the end of a shaft 36. This shaft is rotatably supported in a horizontal position above base plate 15, in position for selective driving engagement of gear 35 with either gear 29 or 30, by means of vertical bearing support 37 which is mounted on base plate 15 by means of a bracket 38.

The vertical bearing support 37 and a second vertical bearing support 40 rotatably support a screw shaft 41. This shaft is provided with a spur gear 42 which engages a spur gear 39 mounted on shaft 36. A portion of shaft 41 is threaded to provide an indexing screw thread 43 with which an indexing screw follower assembly 44 co-operates. The follower assembly 44 is supported for horizontal sliding movement on a pair of slide bars 45 and 46 which are mounted in a horizontal position above base plate 15 upon the vertical support member 40 and a vertical support member 47 with the latter also serving as an intermediate support for indexing screw shaft 41.

Figure 3:
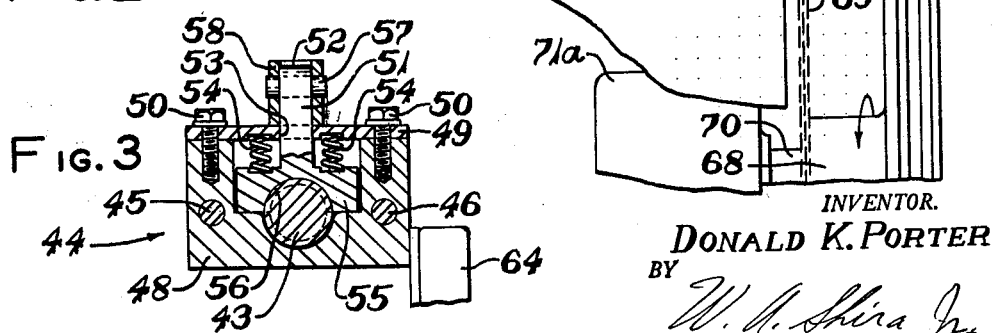
FIG. 3 is a fragmentary cross-sectional view of the indexing screw follower assembly taken along line 3—3 of FIG. 2.

The follower assembly 44 is shown in FIG. 3 as comprising a U-shaped member 48, slidably mounted on the guide bars 45 and 46, with an upper retaining plate 49 mounted on the upper extremities of the vertical legs of the member 48, by means of bolts 50, to enclose the screw shaft 41. The assembly 44 is held in driving engagement with the threaded portion 43 of screw shaft 41 by means of an inverted-T-shaped follower 51 arranged between the vertical legs of the member 48 with its stem 52 passing through an aperture 53 formed in the center of the retaining plate 49. In the underside of the cross bar portion 55 of the follower member 51 is half of a female thread 56 held in normal engagement with the threaded portion 43 of shaft 41 by means of a pair of springs 54 arranged to either side of the stem 52, and compressed between, and bearing against the underside of the retaining plate 49 and the upper surface of cross bar 55. Pivotally mounted on the upper end of stem 52 by means of a cross pin 57 is a reset handle 58. The end of the handle 58 adjacent cross pin 57 has a camming surface 59 formed thereon which is engageable with the upper surface of retainer plate 49 to effect raising of the T-shaped follower 55 from engagement with indexing screw thread 43 when handle 58 is raised.

Mounted on one side of the indexing screw follower assembly 44 is a limit switch 64. An indexing bar 60 is removably mounted, by means of screws 61, on base plate 15 beneath and parallel to the line of travel of limit switch 64. The indexing bar 60 has a plurality of indexing tabs 62 press fitted into a longitudinal slot 63 formed in the indexing bar 60 and spaced from one another predetermined distances, with the tops of the tabs 62 adapted to engage the actuating member 64a of limit switch 64. The member 64a is hinged, in a manner not shown, so that, as the follower assembly 44 is reset and slid along bars 45 and 46 toward vertical support member 47, the actuating member 64a pivots at its hinge away from the switch 64 and does not actuate it as the indexing tabs 62 are engaged.

The end of shaft 36 opposite miter gear 35 is provided with a sprocket 66. Passing about the sprocket 66 and a sprocket 67, which is mounted on the hub 68 of the building form 13, is a drive chain 69. Hence, shaft 36 is rotated in timed relationship with rotation of the building form 13. The form 13, which is mounted on shaft 70, is driven by means of a motor 71 operatively connected to the shaft 70 by means of a gear reducer 71a.

Figure 6:
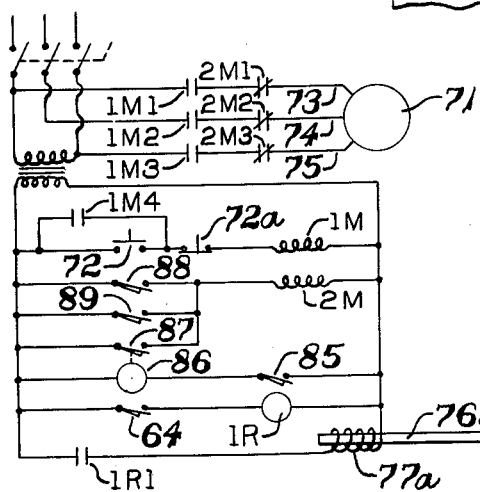
FIG. 6 is a schematic representation of the electrical and pneumatic components of the apparatus.

In operating the machine 10, the operator tapes the end of a single wire strand 11 to the building form 13, placing the wire between the vertical guide rolls 16 and on top of a horizontal guide roll 16a mounted adjacent to vertical guide rolls 16. The follower assembly 44 is moved, by raising handle 58 to disengage the female thread 56 from thread 43 and sliding the assembly on slide bars 45 and 46, until assembly 44 abuts against vertical support member 47. The operator then momentarily depresses start button 72 to energize relay 1–M, see FIG. 6. Energization of relay 1–M causes its contacts 1–M1, 1–M2, 1–M3 and 1–M4 to close. Closure of contact 1–M4 effects a holding circuit about start switch 72 and closure of contacts 1–M1, 1–M2 and 1–M3 allows current to flow in wires 73, 74 and 75, respectively, starting the drive motor 71 which causes the building form 13 to rotate. At the moment of starting the machine 10, the pistons 76 of the 4-way solenoid operated, spring returned, valve 77 are held in the position shown in full line in FIG. 6 by means of a spring 78. This allows air from feed line 79 to flow through line 80 to the left side of piston 32 to hold piston 32 and piston rod 33 in the retracted position shown in full line in FIG. 6, air from the right side of piston 32 being exhausted through line 81 to exhaust line 82. Miter gear 30 is thus held in driving contact with miter gear 35 to rotate the reversing screw shaft 25 and move the reversing screw follower 23 toward the front of the apparatus 10. This, in turn, causes the traverse arm 18 to partially rotate in a counterclockwise direction about bolt 19 as viewed in FIG. 1. Thus, with reference to the same figure, the wire 11 is traversely wound from the left to the right side of the building form 13.

Figure 2:
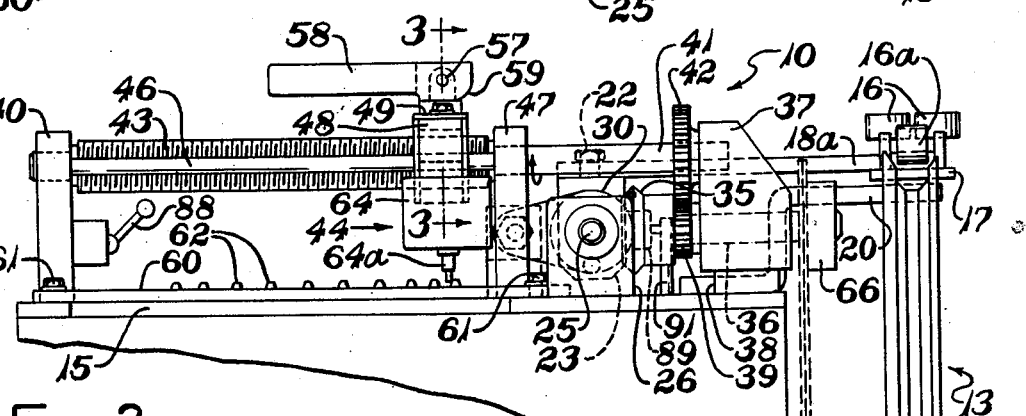
FIG. 2 is a front elevational view of the apparatus shown in FIG. 1.

During the traverse of the wire 11, the indexing screw follower assembly 44 is progressively moved to the left as seen in FIGS. 1 and 2. As the wire 11 reaches the side of the building form 13, the normally open limit switch 64 engages the first of the indexing tabs 62 and is closed. This allows current to flow to energize sequence relay 1–R, causing its contacts 1–R1 to close. This relay, of a type manufactured by the Struthers Dunn Co., Pitman, New Jersey, under catalog number B–11BXX, is so constructed that its even numbered energizations open its contacts 1–R1 and the odd numbered energizations close its contacts 1–R1. Closure of contact 1–R1 energizes the coil 77a of solenoid valve 77, forcing its piston rod 76a and pistons 76 to compress the spring 78 until pistons 76 have taken their dotted line positions shown in FIG. 6. Air is then exhausted from the left side of piston 32 in the air cylinder 31 through line 80 to exhaust line 83 while air under pressure is admitted to the right side of piston 32 through line 81 to force the piston to its dotted line position. By means of the aforementioned connections, level gear 30 is disengaged from, and bevel gear 29 is engaged with, bevel gear 35 to reverse the rotation of reversing screw 24 thus reversing the traverse of the wire 11 on the building form 13.

Winding of the wire upon the form continues in this direction until the limit switch 64 engages the next indexing tab 62. When this occurs the sequence relay 1–R is again energized, this time to open contacts 1–R1. This de-energizes coil 77a allowing the spring 78 to return the valve piston 76 and air cylinder 32 to their original starting positions, again reversing the traverse of the wire 11 on the building form 13. This process is continued until a predetermined number of revolutions of the building form 13, and hence a preselected number of wire convolutions thereon, are attained.

The hub 68 of the building form 13 is provided with a cam 84 which is engageable with a normally open limit switch 85 as the building form 13 is rotated. Limit switch 85 is, therefore, closed momentarily with each revolution of the building form 13 and each closure energizes a pre-settable revolution counter 86 of the type known as a Microflex counter (type HZ40A6, model No. 2) manufactured by the Eagle Signal Co., Moline, Illinois. When the predetermined number of revolutions for which counter 86 has been pre-set have been reached, the counter 86 causes its contacts 87 to close, energizing a relay 2–M. Energization of relay 2–M causes its contacts 2–M1, 2–M2 and 2–M3 to open, stopping the flow of current to the windings of the drive motor 71 and thereby stopping rotation of the building form 13.

The apparatus 10 is also provided with override switches 88 and 89, either of which when closed, energize relay 2–M to stop the machine. Switch 88 is mounted on vertical support bearing 40 so as to contact and prevent override of the indexing screw follower assembly 44. Switch 89 is mounted on the reversing screw follower 23 for override contact with vertical limit pins 90 and 91 mounted on the base plate 15, to prevent the wire 11 from riding over the sides of the building form 13 in the event of a control malfunction. Also, by means of stop switch 72a, the operator may stop the machine at any time he desires. When winding of the bead core 12 has been completed, the operator cuts and tapes the end of the wire 11 to the convolutions on the form 13.

The building form 13 has two movable rim portions 92 and 93 which are each pivotally mounted at one end, 94 and 95, respectively, to the diametrically extending spokes 96 of the form 13. The other ends of the rim portions 92 and 93 are held in their normally uncollapsed position by a releasable latch mechanism. As here shown, this mechanism comprises a dog 97 on the rim portion 92 engageable with the adjacent end of the rim portion 93, with the rim portion 92 held in its normally uncollapsed position by means of a pair of toggle links 98 and 99. The adjacent ends of the links 98 and 99 are pivotally joined together at 100 and their opposite ends are pivotally connected, respectively, to the dog 97, of rim portion 92, and to a projection 101 of the hub 68. The two rim portions 92 and 93 may be collapsed radially inwardly by means of a handle 102, mounted at the pivot joint 100 of the two links 98 and 99, which may be moved counterclockwise, as seen in FIG. 5, to position the parts as shown in phantom. The wound bead core 12 may be easily removed from the form 13 when it is thus manipulated.

The operator then returns the building form segments 92 and 93 to their running positions after removal of a wound bead core and tapes to the form 13 the end of wire 11 extending through the guides 16 and 16a from a wire supply spool not shown. The operator then resets the counter 86 and returns the follower assembly 44 to its starting position. The machine is now in readiness to wind another bead core.

Although the invention has been described with reference to one specific embodiment and the use thereof in winding tire bead cores, it will be readily apparent to those skilled in the art to which it pertains that modifications may be made in the illustrated and described mechanism and that it may be readily adapted for the winding of articles other than bead cores without departing from the spirit and scope of the invention as defined in the appended claims.

Having thus described the invention, I claim:

1. An apparatus for forming an annular bead core for a tire from a plurality of convolutions of a single wire, the said apparatus comprising a frame, a collapsible annular building form rotatably mounted on said frame, means to rotate said form, a lever pivotally mounted on said frame intermediate its ends, wire guide means rotatably mounted on one arm of said lever, a screw rotatably mounted on said frame, shiftable gear means selectively operable to rotate said screw in either direction, a screw follower movably supported on said screw, means pivotally connecting said screw follower to the other arm of said lever, an indexing screw rotatably mounted on said frame and rotated in timed relationship with said form, an indexing screw follower slidably mounted on said frame and engageable with said indexing screw, fluid pressure means to operate said shiftable gear means, means to actuate said fluid pressure means in accordance with different preselected amounts of rotation of said form comprising sensing means mounted on said indexing screw follower and a plurality of settable indexing tabs removably mounted on said frame in a selected spaced relationship for actuating engagement by said sensing means as said indexing screw follower moves in only one direction.

2. Apparatus as defined in claim 1 wherein said indexing screw follower assembly comprises a threaded screw engaging portion and means operable to withdraw said screw engaging portion from engagement with said indexing screw for movement in directions axially of said indexing screw.

3. An apparatus for forming an annular bead core for a tire from a plurality of convolutions of a single wire, the said apparatus comprising a frame, a collapsible annular building form rotatably mounted on said frame, means to rotate said form in one direction, a lever pivotally mounted on said frame intermediate its ends, wire guide means rotatably mounted on one arm of said lever, a first shaft rotatably mounted on said frame, a pair of opposed miter gears keyed to and jointly slidably mounted on said first shaft, a screw thread formed on said first shaft, a screw follower movably mounted on said screw shaft, a screw follower movably mounted on said screw threads, means pivotally connecting said screw follower to the other arm of said lever, a second shaft rotatably mounted on said frame at a right angle to said first shaft, a first spur gear mounted on said second shaft, a third miter gear mounted on the end of said second shaft adjacent said first shaft, a third shaft rotatably mounted on said frame in parallel relationship with and above said second shaft, an indexing screw formed on said third shaft, a spur gear mounted on said third shaft and engaged with said first spur gear, an indexing screw follower slidably mounted on said frame engageable with said indexing screw for movement in but one direction when so engaged, means interconnecting said second shaft and building form for rotation of said second shaft in timed relationship with said building form, fluid pressure means operable to selectively urge one of said pair of miter gears into engagement with said third miter gear, and means to actuate said fluid pressure means comprising: sensing means mounted on said indexing screw follower, an indexing bar removably mounted on said frame in parallel relationship with said indexing screw, a plurality of indexing tabs individually removably mounted on said indexing bar in a preselected spaced relationship for actuating engagement with said sensing means as said indexing screw follower moves in said one direction, and an electrical control circuit including switch means operable by said sensing means to control actuation of said fluid pressure means.

4. An apparatus for forming an annular bead core for a tire from a plurality of convolutions of a single wire, the said apparatus comprising a frame, a collapsible annular building form rotatably mounted on said frame, means to rotate said form in one direction, a lever pivotally mounted no said frame intermediate its ends, wire guide means rotatably mounted on one end of said lever, a first shaft rotatably mounted on said frame, a pair of opposed miter gears keyed to and jointly slidably mounted on said first shaft, a screw thread formed on said first shaft, a screw follower movably mounted on said screw thread, a vertical lug mounted on said screw follower, a slot formed in the other end of said lever engaged with said lug, a second shaft rotatably mounted on said frame at a right angle to said first shaft, a first spur gear mounted on said second shaft, a third miter gear mounted on the end of said second shaft adjacent said first shaft, a third shaft rotatably mounted on said first shaft, a third shaft rotatably mounted on said frame in parallel relationship with and above said second shaft, an indexing screw thread formed on one end of said third shaft, a spur gear mounted on the other end of said third shaft and in engagement with said first spur gear, an indexing screw follower assembly slidably mounted on said frame engageable with said indexing screw for movement in one direction when so engaged, means interconnecting said second shaft and building form for rotation of said second shaft in timed relationship with said building form, fluid pressure means to selectively urge one of said pair of miter gears into engagement with said third miter gear, means to actuate said fluid pressure means comprising: sensing means mounted on said screw thread follower assembly, an indexing bar removably mounted on said frame in parallel relationship with said indexing screw, a plurality of indexing tabs mounted on said indexing bar in a selectively spaced relationship engageable with said sensing means as said assembly moves in said one direction, and means to terminate rotation of said building form in response to a predetermined number of revolutions of said form.

5. An apparatus for forming an annular bead core for a tire from a plurality of convolutions of a single wire, the said apparatus comprising a frame, an annular building form rotatably mounted on said frame, means to rotate said form in one direction, a lever pivotally mounted on said frame at a point intermediate the ends of said lever, wire guide means mounted on one end of said lever, rocking means operable to rock said lever in reverse directions, an indexing screw rotatable in timed relation to the rotation of said form, a screw follower engageable with said indexing screw for movement in one direction, sensing means mounted on said screw follower, a plurality of settable indexing tabs removably mounted on said frame in a selected lineally spaced relationship for engagement by said sensing means as it moves in said one direction, and means to operate said rocking means to sequentially reverse the direction of rocking movement of said lever in response to engagement of said sensing means with said tabs.

6. An apparatus as defined in claim 5 and further comprising means to terminate rotation of said form in response to a predetermined extent of rotation thereof.

References Cited in the file of this patent

UNITED STATES PATENTS

| | | |
|---|---|---|
| 1,616,068 | Trenck | Feb. 1, 1927 |
| 1,927,811 | Stevens | Sept. 19, 1933 |
| 1,994,373 | Thorne | Mar. 12, 1935 |
| 2,016,865 | Lerch | Oct. 8, 1935 |
| 2,254,221 | Hubbard | Sept. 2, 1941 |
| 2,533,382 | Lorenz | Dec. 12, 1950 |
| 2,653,773 | Davis | Sept. 29, 1953 |
| 2,959,372 | Sadorf | Nov. 8, 1960 |
| 3,061,236 | Lang | Oct. 30, 1962 |

FOREIGN PATENTS

| | | |
|---|---|---|
| 115,464 | Australia | June 30, 1942 |
| 771,403 | Great Britain | Apr. 3, 1957 |